US006822562B2

(12) United States Patent
Poirier et al.

(10) Patent No.: US 6,822,562 B2
(45) Date of Patent: Nov. 23, 2004

(54) METHOD OF DIFFERENTIATING TIRES IN A VEHICLE

(75) Inventors: James Anthony Poirier, Sterling Heights, MI (US); Steve O'Connor, West Bloomfield, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 133 days.

(21) Appl. No.: 10/134,032

(22) Filed: Apr. 26, 2002

(65) Prior Publication Data

US 2002/0196137 A1 Dec. 26, 2002

Related U.S. Application Data

(60) Provisional application No. 60/341,027, filed on Oct. 30, 2001, and provisional application No. 60/286,868, filed on Apr. 26, 2001.

(51) Int. Cl.[7] .............................................. B60C 23/00
(52) U.S. Cl. ....................... 340/445; 340/442; 340/447; 73/146.5
(58) Field of Search ................................ 340/445, 442, 340/447, 10.1, 10.3, 40.4; 73/146.5, 146.2, 146.4; 200/61.23, 61.22

(56) References Cited

U.S. PATENT DOCUMENTS

| 4,301,442 A | | 11/1981 | Croissant |
| 4,450,431 A | * | 5/1984 | Hochstein .................. 340/447 |
| 5,900,808 A | | 5/1999 | Lebo |
| 6,018,993 A | | 2/2000 | Normann et al. |
| 6,034,596 A | | 3/2000 | Smith et al. |
| 6,369,703 B1 | * | 4/2002 | Lill ............................ 340/447 |
| 6,414,592 B1 | * | 7/2002 | Dixit et al. ................. 340/447 |
| 6,441,728 B1 | * | 8/2002 | Dixit et al. ................. 340/447 |
| 6,489,888 B1 | * | 12/2002 | Honeck et al. ............. 340/442 |
| 6,518,876 B1 | * | 2/2003 | Marguet et al. ............ 340/447 |

FOREIGN PATENT DOCUMENTS

| DE | 19652365 | 4/1998 |
| EP | 0373170 | 10/1991 |
| EP | 0933236 | 8/1999 |
| WO | WO 8809976 | 12/1998 |

OTHER PUBLICATIONS

PCT International Search Report for Application No. PCT/US02/13297 dated Aug. 13, 2002.
Smartire Systems, Inc., "Wireless Pressure Monitor System", Owner's Manual, 1998, pps 42–46; printed in Canada.

* cited by examiner

*Primary Examiner*—Nina Tong

(57) ABSTRACT

A tire differentiating system (21, 121) is employed to differentiate tires (22, 24, 26, 28, 122, 124, 126, 128) in a vehicle (20, 120). Each tire includes a sensor (30, 32, 34, 36, 120, 132, 134, 136) which communicates with a receiver (38, 138). In a first example, when a tire (22, 24, 26, 28) is inflated above a high pressure threshold, a flag bit is stored in the sensor (30, 32, 34, 36) identifying the tire as a rear tire (26, 28). If a rear tire (26, 28) drops below a low pressure threshold, a warning algorithm is initiated to warn the driver. In a second example, the sensor (130, 132, 134, 136) is a transceiver with an RF detector circuit having an identification code. A RF transmitter (144, 146, 148, 150) is located proximate to each of the respective transceivers (130, 132, 134, 136). The receiver (138) sends a signal to each RF transmitter (144, 146, 148, 150) which generates a RF signal that is sent to the transceivers (130, 132, 134, 136). The transceivers (130, 132, 134, 136) then send a return signal including the identification code back to the receiver (138), identifying the tire (122, 124, 126, 128) at the location.

6 Claims, 1 Drawing Sheet

METHOD OF DIFFERENTIATING TIRES IN A VEHICLE

This application claims priority from provisional application serial No. 60/286,868 filed Apr. 26, 2001 and No. 60/341,027 filed Oct. 30, 2001.

BACKGROUND OF THE INVENTION

The present invention relates generally to a method of differentiating tires in a vehicle including a tire pressure monitoring system by communicating tire identification information in a sensor to a receiver to identify the location of the tires.

It is often desirable to differentiate between the lower pressure front tires and the higher pressure rear tires on certain vehicles, especially trucks. The front tires generally are at a pressure of about 35 psi. The desired pressure of the rear tires varies depending on the load of the vehicle, but is generally in the range of 60–75 psi. As the rear tires are at a higher pressure, it is important to monitor them to ensure that the high pressure is maintained.

Tire pressure monitoring systems (TPMS) have been employed to monitor the pressure in the tires. In one prior system, the vehicle operator is alerted when a sensor in the tire detects that the pressure in the tire drops below a predetermined level. Each sensor includes an electronic code identifier. When the sensor detects that the pressure in the tire drops below the predetermined level, the sensor sends a signal to a receiver, displaying the electronic code identifier and alerting the operator of the problem. A drawback to this prior system is that even if the identity of the problem tire is known, the location of the problem tire is not as the electronic code identifier only identifies the tire, not the tire location. Commonly, after being alerted to a problem, the operator determines the location of the problem tire by manual inspection.

Pressure responsive switches have also been utilized to monitor tire pressure and to indicate to an operator when the tire pressure is too high to too low. In one prior system, a switch is activated when the tire pressure is too high or too low, indicating the pressure is not optimal. However, even if the operator is made aware of the problem, the operator does not know the location of the tire.

SUMMARY OF THE INVENTION

A tire differentiating system is employed to differentiate tires in a vehicle. In a first example, each tire includes a sensor which communicates with a receiver to differentiate the front tires from the rear tires. When a tire is inflated above a high threshold pressure, a flag bit is stored in the sensor. As only the rear tires are inflated to a pressure greater than the high threshold pressure, only the rear tires have a flag bit.

If a sensor with a flag bit detects that the tire pressure drops below a low pressure threshold, a warning algorithm is initiated to warn the driver of the low pressure condition. As the front tires never reach a pressure high enough to retain the flag bit in the sensor, a pressure drop below the low pressure threshold in the front tires will not initiate the warning algorithm. The flag bit is permanently retained in the sensor until reset by reducing the pressure in the tire to zero.

A second example of the invention differentiates all of the tires in a vehicle. The sensor is a transceiver with a RF detector circuit. An identification code is stored in each transceiver and includes information regarding tire size, material, and rim size. A RF transmitter having an antenna is proximate to each of the tires in the wheel well.

To differentiate the tires, the receiver sends a RF signal to one of the RF transmitters in a tire in a known location. After receiving the signal, the RF transmitter generates a RF signal which is sent to the corresponding transceiver in the tire. As the transmitter is proximate to the transceiver, only the desired transceiver will receive the RF signal. After receiving the signal, the transceiver then sends a return signal including the identification code to the receiver. After recognizing the identification code, the receiver relates the identification code to the location. This process is repeated for each tire location to identify the tire in each location.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred example. The drawings that accompany the detailed description can be briefly described as follows.

DETAILED DESCRIPTION OF THE PREFERRED EXAMPLE

Figure 1:
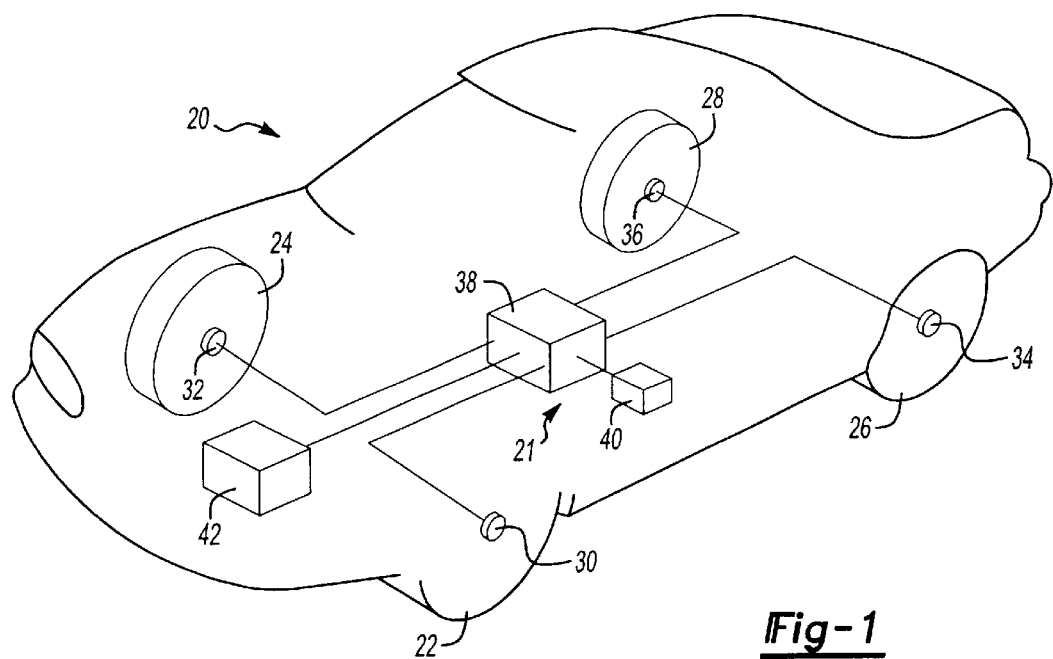
FIG. 1 illustrates a top schematic view of a first example of a tire differentiating system of the present invention.

FIG. 1 schematically illustrates a top view of a vehicle 20 including a first example of a tire differentiating system 21 which differentiates the rear tires 26 and 28. The vehicle 20 includes a set of front tires 22 and 24 and a set of rear tires 26 and 28, each including a sensor 30, 32, 34 and 36, respectively, and each having an identification code. The sensors 30, 32, 34 and 36 communicate with a receiver 38 powered by an external energy source 40. Preferably, the external energy source 40 is a battery.

The rear tires 26 and 28 are inflated to a pressure greater than the pressure of the front tires 22 and 24. Preferably, the front tires 22 and 24 are inflated to 35 psi, and the rear tires 26 and 28 are inflated to a pressure between 60 psi and 75 psi. The pressure of the rear tires 26 and 28 varies as the load of the vehicle 20 varies. Although specific pressures are described, it is to be understood other pressures can be employed.

When the tires 26 and 28 are inflated to a pressure above a high threshold pressure, a flag bit is triggered and stored in the respective sensors 34 and 36, and the identification code is communicated to the receiver 38. The receiver 38 then associates the identification codes of the tires 26 and 28 with the flag bits as rear tires. The high threshold pressure is greater than the pressure of the front tires 22 and 24, and therefore only the rear tires 26 and 28 will have a flag bit retained in the sensor 34 and 36. Preferably, the high threshold pressure is between 40 and 50 psi. The sensors 34 and 36 communicate with the receiver 38 and which identifies the tires 26 and 28 as rear tires. Alternatively, the flag bit in the sensors 34 and 36 is triggered by the receiver 38, which then associates the flag bit with rear tires 34 and 36.

If the sensors 34 and 36 detect that the pressure in the rear tires 26 and 28 drops below a low pressure threshold, a warning algorithm is initiated to warn the driver of the low pressure condition. Preferably, the low pressure threshold is 25 psi. Only a drop in pressure in the tires with a flag bit will initiate the warning algorithm. As the front tires 22 and 24 never reach a pressure great enough to trigger the flag bit, a pressure drop below the low pressure threshold in the front tires 22 and 24 will not initiate the warning algorithm 42.

The warning algorithm generates a warning signal 42 which indicates to the driver that the pressure in the rear tires 26 and 28 has dropped below the low pressure threshold. The warning signal 42 can be audio or visual, such as a flashing or solid light in the vehicle cab. The warning algorithm can be generated either if there is a rapid or a gradual change in pressure the tires rear 26 or 28.

After being triggered, the flag bit is permanently retained in the sensors 34 and 36. If the tires 22, 24, 26 and 28 are rotated, the flag bits in the sensors 34 and 36 must be reset. Preferably, the sensors 34 and 36 are reset by reducing the pressure in the rear tires 26 and 28 to zero. Once the sensors 34 and 36 sense zero pressure and are reset, the sensors 30, 32, 34 and 36 can re-learn the type of tire the sensors 30, 32, 34 and 36 are mounted in.

Figure 2:
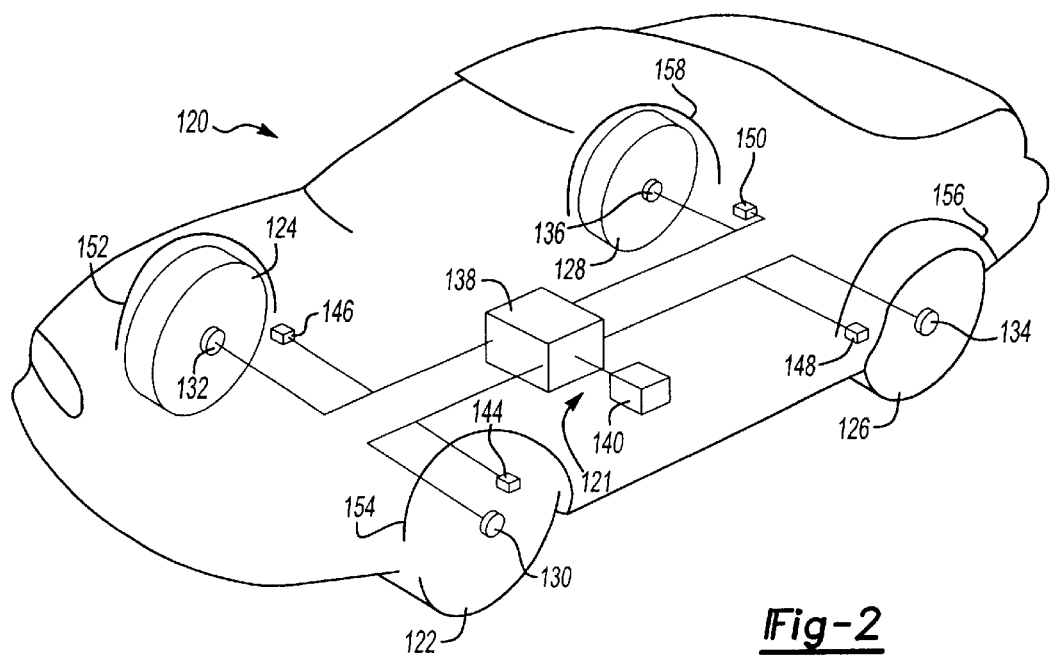
FIG. 2 illustrates a top schematic view of a second example of a tire differentiating system of the present invention.

FIG. 2 illustrates a second example of a tire differentiating system 121 employing a tire pressure monitoring system. Each tire 122, 124, 126 and 128 on the vehicle 120 includes a respective transceiver 130, 132, 134 and 136 with a RF detector circuit. Each transceiver 130, 132, 134 and 136 includes an identification code and information regarding tire size, material, and rim size. A RF transmitter 144, 146, 148 and 150 having an antenna is located in the wheel well 152, 154, 156 and 158 proximate to each of the respective transceivers 130, 132, 134 and 136. The RF transmitters 144, 146, 148 and 150 communicate with a receiver 138 which is powered by an external energy source 140, such as a battery.

To identify the tires 122, 124, 126 and 128, the receiver 138 sends a signal to a RF transmitter 144 in a known location, such as the front driver's wheel well 152. After receiving the signal, the RF transmitter 144 generates a RF signal which is received by the transceiver 130. After receiving the RF signal, the transceiver 130 then sends a return signal including the identification code to the receiver 138. The receiver 138 then relates the identification code of the tire 122 with the front driver's wheel well 152. As the RF transmitter 144 is located in the wheel well 152, the RF signal from the RF transmitter 144 will only be received by the desired transceiver 130 and will be not received by the other transceivers 132, 134 and 136, reducing identification errors. Therefore, when a signal is sent to a specific RF transmitter 144, 146, 148 and 150, only the transceiver 130, 132, 134 and 136, respectively, associated with that RF transmitter 144, 146, 148 and 150, respectively, will respond.

As the receiver 138 sends a signal to each transmitter 144, 146, 148 and 150 individually, the receiver 138 can determine which tire 130, 132, 134 and 136 is in each wheel well 152, 154, 156 and 158. After identifying the tire 122 in the front driver's wheel well 152, the receiver 138 sends a signal to the RF transmitter 146 in the front passenger's wheel well 154. The RF transmitter 146 sends a signal to the transceiver 132, which sends a return signal to the receiver 138 with the identification code of the front passenger tire 124. The receiver 138 then interrogates the remaining transceivers 134 and 136 to determine the identification codes associated with the tires 126 and 128 in these wheel wells 156 and 158.

Alternatively, the tire differentiating system 121 can be employed to locate a specific tire 122, 124, 126 and 128 and then report to the receiver 138 where the specific tire 122, 124, 126 and 128 is located. The receiver 138 sends a signal to each RF transmitter 130, 132, 134, and 136, searching for a specific identification code. When the receiver 138 receives a return signal with the desired identification code, the receiver 138 determines where the specific tire 122, 124, 126 and 128 is located.

The transceivers 144, 146, 148 and 150 are activated only when the receiver 138 sends a signal, increasing the life of the external energy source 140. The external energy source 140 can further be increased by decreasing the number of times the transceivers 144, 146, 148 and 150 are interrogated and by controlling the rate of information reporting. Additionally, if the tires are rotated, the receiver 138 can re-learn the position of each tire 130, 132, 134 and 136 by repeating the interrogation process.

Although only four tires have been disclosed and described, it is to be understood that additional tires can be employed depending on the vehicle type.

The foregoing description is only exemplary of the principles of the invention. Many modifications and variations of the present invention are possible in light of the above teachings. The preferred examples of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A tire differentiating system comprising:

a plurality of tires;

a sensor in each of said plurality attires including an identifier; and a receiver which communicates with each of said sensors to receive said identifier and determine a location of said tires;

wherein said system further includes a transmitter for each of said sensors, and wherein said receiver sends a first signal to each of said transmitters, each of said transmitters send a second signal to said respective sensor, and said sensor includes a transceiver which sends said identifier to said receiver.

2. The system as recited in claim 1 wherein each of said transmitters are located in a wheel well in one of said locations.

3. The system as recited in claim 2 wherein each of said identifier is associated with one of said locations.

4. The system as recited in claim 1 wherein said transmitter is a RF transmitter, said sensor includes a RF circuit, and said second signal is a RF signal.

5. A method of differentiating a plurality of tires comprising the steps of:

providing said plurality of tires each including a sensor having an identifier end a receiver which communicates with said sensors;

communicating said identifier to said receiver; end determining a location of each of said tires, further including the steps of providing a transmitter for each of said sensors, sending a first signal to each of said transmitters, sending a second signal from said transmitters to said respective sensor, and the step of communicating said identifier includes sending said identifier from a transceiver of said sensor to said receiver after said sensor receives said second signal, and the step of determining said location includes associating said identifier with one of said locations.

6. The method as recited in claim 5 wherein said transmitter is a RF transmitter, said sensor includes a RF circuit, and said second signal is a RF signal.

* * * * *